(No Model.)
W. W. JOHNSON.
PAN LIFTER.
No. 594,475. Patented Nov. 30, 1897.
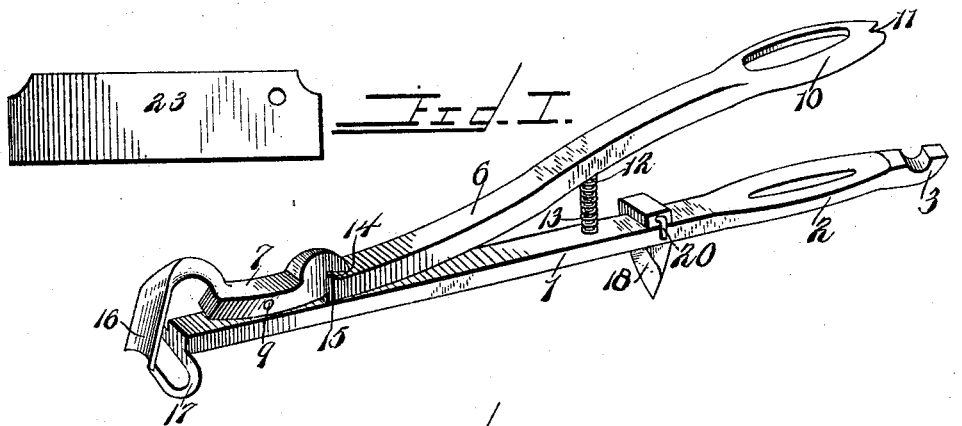
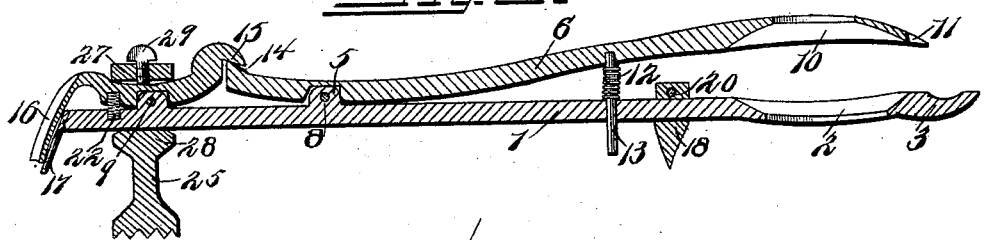
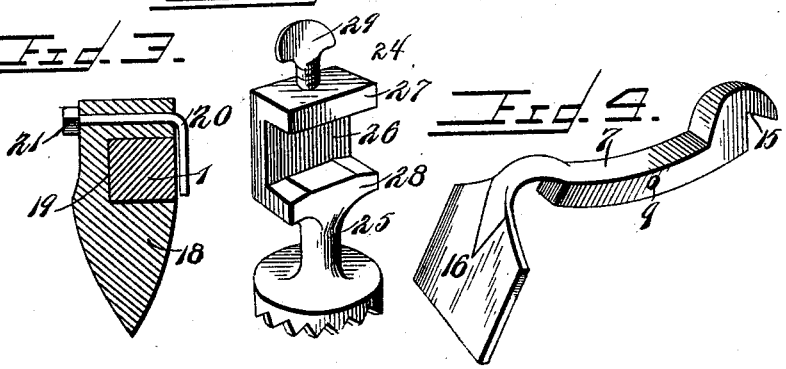
Witnesses
R. A. Shepard
J. F. F. Riley
Inventor
William W. Johnson
By his Attorneys,
C. A. Snow & Co.

UNITED STATES PATENT OFFICE.

WILLIAM W. JOHNSON, OF BEEBE, ARKANSAS.

PAN-LIFTER.

SPECIFICATION forming part of Letters Patent No. 594,475, dated November 30, 1897.

Application filed June 15, 1897. Serial No. 640,842. (No model.)

*To all whom it may concern:*

Be it known that I, WILLIAM W. JOHNSON, a citizen of the United States, residing at Beebe, in the county of White and State of Arkansas, have invented a new and useful Pan-Lifter, of which the following is a specification.

This invention relates to improvements in pan-lifters.

The object of the present invention is to improve the construction of pan-lifters and to provide a simple, inexpensive, and efficient device capable of firmly gripping a pan or similar cooking utensil and of enabling the same to be readily moved or carried.

A further object of the invention is to provide a pan-lifter which will also be adapted for lifting stove-lids and opening cans.

The invention consists in the construction and novel combination and arrangement of parts, as hereinafter fully described, illustrated in the accompanying drawings, and pointed out in the claims hereto appended.

In the drawings, Figure 1 is a perspective view of a pan-lifter constructed in accordance with this invention, the jaws being spread preparatory to gripping a pan. Fig. 2 is a longitudinal sectional view, the jaws being closed. Fig. 3 is a detail sectional view illustrating the manner of mounting the can-opening blade. Fig. 4 is a detail view showing a modification of the engaging lever. Fig. 5 is a detail view of the scraper-blade. Fig. 6 is a detail perspective view of the beefsteak-tenderer.

Like numerals of reference designate corresponding parts in the several figures of the drawings.

1 designates a bar provided at one end with a handle 2 and having an extension 3, forming a lid-lifter and adapted to engage the socket of a lid or cover of a stove in the usual manner. The bar is provided at points between its ends with perforated ears or projections 4 and 5, to which are fulcrumed levers 6 and 7, provided with recesses receiving the perforated ears or projections and perforated for the reception of pivots 8 and 9.

The lever 6, which is an operating-lever, diverges from the handle portion of the bar 1 and is provided with a similar handle 10 and has a claw 11 at its extremity for extracting tacks. A spring 12 is interposed between the bar 1 and the lever 6, which is fulcrumed near its outer end, and the said spring is disposed on a supporting pin or rod 13, secured to the operating-lever and loosely arranged in a perforation of the bar 1. The outer end of the operating-lever is provided with a wedge-shaped projection 14, formed on the outer face of the lever and extending outward from the device and arranged to engage the inner end of the lever 7. The lever 7, which has its inner end enlarged and outwardly offset, is provided with a triangular recess 15 for the reception of the wedge-shaped projection 14, and when its inner end is forced outward by the operating-lever its outer end, which carries a jaw 16, is forced toward the outer end of the bar 1, which is provided with a jaw 17.

The jaw 17, which is circular, as shown, has a flat engaging face and is disposed at an angle to the length of the bar and depends therefrom. The jaw 16, which may be curved, as shown in Figs. 1 and 2, or straight, as illustrated in Fig. 4, depends from the outer end of the engaging lever and is located outside the jaw of the bar 1. The jaws 16 and 17, which are disposed substantially at right angles to the bar 1, are adapted to grip firmly the side of a can, skillet, or analogous cooking utensil, and the device, by the double action of the levers, will enable such utensil to be easily carried or moved without liability of dropping it.

A can-opening blade 18 is mounted on the bar, which is preferably rectangular in cross-section, as shown, and the said blade, which is tapering, is provided with a shank having a rectangular recess 19 to fit the bar and is secured to the same by a pivoted fastening device 20. The pivoted fastening device 20 consists of a stem or pivot and an arm which swings across the mouth of the recess and engages the bar 1. The upper end of shank is perforated to receive the pivot, which is threaded and is retained in the perforation of the shank by a nut 21.

A spring 22 is interposed between the outer end of the engaging lever and the outer portion of the bar and has its terminals received in suitable sockets, and the extreme outer portion of the engaging lever is curved, as shown.

The device is adapted to be employed for removing ashes from a stove, and for this purpose a scraper-blade 23 is provided and is adapted to be gripped between the jaws 16 and 17, whereby it is held in proper position for use. The blade is provided at one end with a perforation, and it may be hung up in a convenient position when not in use.

The device is also adapted for tendering beefsteak, and it is provided with a beefsteak-tenderer 24, comprising a head, a shank 25, and a clamp 26, which is adapted to engage the lever 7 and the bar 1 at a point directly over the pivot, whereby the jaw is held rigid with the bar 1. The head of the beefsteak-tenderer is provided with pointed projections for engaging and tendering the meat, and the clamp is provided with upper and lower rigid jaws 27 and 28. The upper jaw 27 is provided with a threaded perforation for the reception of a clamping-screw 29, which extends through the upper jaw and bears against the lever 7.

The invention has the following advantages: The device is simple and comparatively inexpensive in construction, it forms an effective pan and stove-lid lifter, and it is capable of extracting tacks and opening cans. It is also adapted for removing ashes from stoves, and it is an effective beefsteak-tenderer.

What I claim is—

1. A pan-lifter comprising a bar provided at one end with a handle and having at its other end, a depending jaw disposed substantially at right angles to it, an operating-lever fulcrumed between its ends on the bar, provided at its inner end with a handle and having at its other end a substantially triangular or wedge-shaped projection 14 formed on the outer face of the lever and extending outward from the device, a spring interposed between the handle portions of the bar and the lever, an engaging lever fulcrumed between its ends on the bar and having its inner end enlarged and outwardly offset and provided with a triangular recess receiving the said projection, a jaw depending from the outer end of the engaging lever and coöperating with the jaw of the bar, and a spring interposed between the outer end of the engaging lever and the bar, substantially as described.

2. In a device of the class described, the combination with a bar forming a support and provided at one end with a handle, of a can-opening blade provided at its shank with a recess receiving the bar, said shank being adapted to be introduced on the bar at a point between the ends thereof and a pivoted locking device having a depending arm extending across the mouth of the recess and engaging the bar, substantially as described.

In testimony that I claim the foregoing as my own I have hereto affixed my signature in the presence of two witnesses.

WILLM. W. JOHNSON.

Witnesses:
WILEY A. JOHNSON,
JAMES M. BEEBE.